(12) United States Patent
Gerst et al.

(10) Patent No.: US 11,884,846 B2
(45) Date of Patent: Jan. 30, 2024

(54) ADHESIVE COMPOSITION HAVING A GEL CONTENT BASED ON CROSS-LINKING VIA KETO GROUPS OR ALDEHYDE GROUPS

(71) Applicant: BASF SE, Ludwigshafen am Rhein (DE)

(72) Inventors: Matthias Gerst, Ludwigshafen (DE); Dirk Wulff, Ludwigshafen (DE)

(73) Assignee: BASF SE

( * ) Notice: Subject to any disclaimer, the term of this patent is extended or adjusted under 35 U.S.C. 154(b) by 693 days.

(21) Appl. No.: 17/047,614

(22) PCT Filed: Apr. 10, 2019

(86) PCT No.: PCT/EP2019/059042
§ 371 (c)(1),
(2) Date: Oct. 14, 2020

(87) PCT Pub. No.: WO2019/201696
PCT Pub. Date: Oct. 24, 2019

(65) Prior Publication Data
US 2021/0155834 A1    May 27, 2021

(30) Foreign Application Priority Data

Apr. 20, 2018    (EP) .................... 18168569

(51) Int. Cl.
| | | |
|---|---|---|
| *C09J 133/26* | (2006.01) | |
| *C09J 7/38* | (2018.01) | |
| *C09J 133/10* | (2006.01) | |
| *C08K 5/07* | (2006.01) | |
| *C08K 5/26* | (2006.01) | |

(52) U.S. Cl.
CPC ............ *C09J 133/26* (2013.01); *C09J 7/385* (2018.01); *C09J 133/10* (2013.01); *C08K 5/07* (2013.01); *C08K 5/26* (2013.01); *C09J 2433/00* (2013.01)

(58) Field of Classification Search
CPC .......... C09J 133/26; C09J 7/38; C09J 133/10

USPC ....................................................... 524/192
See application file for complete search history.

(56) References Cited

U.S. PATENT DOCUMENTS

| | | |
|---|---|---|
| 2009/0252959 A1 | 10/2009 | Schumacher et al. |
| 2019/0016931 A1 | 1/2019 | Schumacher et al. |

FOREIGN PATENT DOCUMENTS

| | | |
|---|---|---|
| DE | 2 061 213 A1 | 6/1971 |
| DE | 2 207 209 A1 | 10/1972 |
| DE | 27 22 097 A1 | 11/1978 |
| EP | 0 081 083 A2 | 6/1983 |
| EP | 0 900 651 A1 | 3/1999 |
| EP | 3 202 795 A1 | 8/2017 |
| JP | 2005-281548 A | 10/2005 |
| WO | WO 03/001193 A1 | 1/2003 |
| WO | WO 2006/066761 A1 | 6/2006 |
| WO | WO 2013/117428 A1 | 8/2013 |
| WO | WO 2017/125277 A1 | 7/2017 |
| WO | WO 2017/216108 A1 | 12/2017 |
| WO | WO 2017/1216108 | * 12/2017 |

OTHER PUBLICATIONS

International Search Report dated Jul. 17, 2019 in PCT/EP2019/059042 filed Apr. 10, 2019, 2 pages.

* cited by examiner

*Primary Examiner* — Deve V Hall
(74) *Attorney, Agent, or Firm* — Faegre Drinker Biddle & Reath LLP

(57) ABSTRACT

Described is an adhesive composition in the form of an aqueous polymer dispersion comprising tackifiers, a compound crosslinking via keto or aldehyde groups and a pressure-sensitive adhesive polymer which is formed by emulsion polymerization from soft (meth)acrylic ester monomers, acid monomers, monomers having keto or aldehyde groups, styrene and optionally further monomers, wherein the polymerization may be carried out in the presence of chain transfer agents. The pressure-sensitive adhesive polymer has certain gel contents. The pressure-sensitive adhesive composition may be used to produce adhesive labels, adhesive tapes or adhesive films.

18 Claims, No Drawings

ADHESIVE COMPOSITION HAVING A GEL CONTENT BASED ON CROSS-LINKING VIA KETO GROUPS OR ALDEHYDE GROUPS

The invention relates to an adhesive composition in the form of an aqueous polymer dispersion comprising tackifiers, a compound crosslinking via keto or aldehyde groups and a pressure-sensitive adhesive polymer which is formed by emulsion polymerization from soft (meth)acrylic ester monomers, acid monomers, monomers having keto or aldehyde groups, styrene and optionally further monomers, wherein the polymerization may be carried out in the presence of chain transfer agents. The pressure-sensitive adhesive polymer has certain gel contents. The pressure-sensitive adhesive composition may be used to produce adhesive labels, adhesive tapes or adhesive films.

Pressure-sensitive adhesives for applications in adhesive tapes or adhesive films for example are based on polymer solutions in organic solvents and based on aqueous polymer dispersions obtainable by emulsion polymerization. Increasing use of aqueous systems and eschewal of organic solvents is desirable. However, the adhesive properties of emulsion polymers are not yet equal in every respect to adhesive polymers produced in organic solvents, as is shown by a market share of solvent adhesives of about 50-60% depending on the field of application. Solution polymers are generally very largely unbranched and uncrosslinked, have a comparatively high molecular weight and upon coating of substrates form very homogenous adhesive films in which the long polymer chains can entangle, thus resulting in comparatively high cohesion. It is a consequence of production that emulsion polymerization generally affords polymers having a higher degree of branching and crosslinking than solution polymerization. The degree of branching and crosslinking is measurable by measuring the gel content. The higher the degree of branching and crosslinking of a polymer the higher the gel content thereof. The gel content is the proportion insoluble in methyl ethyl ketone of a polymer film produced from a polymer. The filming of emulsion polymers often results in the formation of heterogeneous films having microscopically detectable interfaces attributable to the dispersion particles, thus altogether reducing cohesion compared to solvent polymers and impairing water resistance. Since the crosslinking of emulsion polymers is predominantly within the dispersion particles but not between polymer chains in different dispersion particles, crosslinking or entanglement of polymer chains beyond the interfaces of the dispersion particles is severely impaired at high gel content, thus making it difficult to improve the cohesion of pressure-sensitive adhesives based on emulsion polymers. It is therefore desirable to avoid side reactions leading to crosslinking or branching during the emulsion polymerization. Such side reactions are normally unavoidable in the case of very rapidly polymerizing acrylate monomers. During free-radical emulsion polymerization of acrylate monomers, dispersion particles generally comprise large amounts of polymer and only very small amounts of acrylate monomers since acrylate monomers react very rapidly. A free-radical entering a dispersion particle therefore encounters predominantly polymer (for example about 95%) and only little monomer (for example about 5%), thus leading to undesired reactions with the polymer.

These include for example H-abstractions from the polymer chains and subsequent grafting, branching or crosslinking reactions. After termination of the emulsion polymerization of acrylate monomers a considerable proportion of polymer chains (for example about 60-80%, corresponding to the gel content) within a dispersion particle is therefore bonded to one another and therefore cannot diffuse beyond particle boundaries during the film formation necessary for use as an adhesive. Only a very small proportion (about 20%) of predominantly linear, soluble polymer chains which do not contribute to the gel content are capable thereof. This limits the cohesive forces in pressure-sensitive adhesive applications.

A reduction in side reactions leading to crosslinkings during the emulsion polymerization of acrylate monomers is possible through the use of chain transfer agents. However, the use of chain transfer agents leads to short polymer chains having a low molecular weight which in turn brings about an undesired limitation of the cohesive forces in pressure-sensitive adhesive applications.

A reduction in side reactions leading to crosslinkings during the emulsion polymerization is also possible through the co-use of comonomers which react more slowly than acrylate monomers, for example styrene. The use of considerable amounts of styrene can have the result that a free radical entering a dispersion particle encounters markedly more monomer (for example about 50%) and less polymer (for example about 50%) than for emulsion polymerization of pure acrylate monomers. However, styrene is a so-called "hard" monomer since it results in polymers having a comparatively high glass transition temperature Tg (the Tg of polystyrene is about 105° C.), which is disadvantageous for pressure-sensitive adhesive applications. Pressure-sensitive adhesive polymers typically have a very low Tg of −40° C. or less for example. A higher Tg results in undesirably reduced adhesion and reduced tack. Adding tackifiers can increase tack but at the same time generally impairs cohesion, so that production of highly cohesive pressure-sensitive adhesives using tackifiers represents a particular challenge.

The use of a crosslinker system based on the reaction of carbonyl groups of an adhesive polymer with dihydrazides is known for example from WO 2017/216108, WO 2006/066761, EP 3202795, WO 2003/01193, EP 900651 and WO 2017/125277. These either do not relate to pressure-sensitive adhesives or relate to polymers having a high gel content gel$_0$ prior to carbonyl/hydrazide crosslinking. A high gel content gel$_0$ prior to carbonyl/hydrazide crosslinking has the result that a high proportion of polymer chains is already crosslinked and therefore cannot diffuse out of the dispersion particle, thus causing the (additional) carbonyl/hydrazide crosslinking to take place substantially within the dispersion particle. This severely limits the cohesion-increasing effect of the additional crosslinking.

It is an object of the present invention to provide aqueous-based, i.e. free from organic solvents, polymeric pressure-sensitive adhesives which are preferably in the form of a stable, one-component composition, have good adhesive properties, in particular improved cohesion similar to that of solution polymers without significantly impairing adhesion and tack, and are as simple and cost-effective to produce as possible.

The present invention provides an adhesive composition in the form of an aqueous polymer dispersion comprising
(a) at least one tackifier,
(b) at least one compound A comprising at least two functional groups capable of undergoing a crosslinking reaction with keto groups or with aldehyde groups;
(c) at least one pressure-sensitive adhesive polymer formed by emulsion polymerization from
  (i) at least 60% by weight, based on the sum of the monomers, of at least one soft (meth)acrylic ester monomer having, when polymerized as a homopolymer, a glass transition temperature of less than 0° C., (ii) 0.1% to 10% by weight, based on the sum of the monomers, of at least one monomer having at least one acid group, (iii) at least 5% and less than 20% by weight, based on the sum of the monomers, of styrene, (iv) 0.3% to 5% by weight, preferably 0.4% to 3% by weight, based on the total amount of monomers, of at least one ethylenically unsaturated compound K having at least one functional group selected from keto groups and aldehyde groups;

(v) optionally further monomers distinct from (i) to (iv), with the exception of monomers having at least two non-conjugated polymerizable vinyl groups, wherein the polymerization is carried out in the presence of 0 to 1 parts by weight of chain transfer agent per 100 parts by weight of monomers, wherein after film formation on a substrate the pressure-sensitive adhesive polymer has a gel content $gel_{tot}$ of at least 80% by weight based on a polymer film produced from the pressure-sensitive adhesive polymer, wherein the gel content is at least partially based on a crosslinking of the keto or aldehyde groups of the polymer with compound A and the gel content $gel_K$ of the pressure-sensitive adhesive polymer based on crosslinking of the keto or aldehyde groups of the polymer with compound A is at least 30% by weight, wherein the gel content may in part also be based on covalent, irreversible crosslinking not effected by crosslinking of the keto or aldehyde groups of the polymer with compound A and the gel content $gel_0$ of the pressure-sensitive adhesive polymer based on covalent, irreversible crosslinking not effected by crosslinking of the keto or aldehyde groups of the polymer with compound A is from 0% to not more than 50% by weight, and wherein the glass transition temperature of the polymer before crosslinking of the keto or aldehyde groups of the polymer with compound A is below 10° C., preferably below −15° C. and above −40° C.; and wherein, after drying, the pressure-sensitive adhesive composition forms a film having a tack of not less than 10 N/25 mm measured as loop tack relative to a steel surface at 23° C., 50% relative humidity and at a tearoff speed of 300 mm/min.

The reported % by weight values of the monomers in each case relate to the sum of all monomers employed in the polymerization unless otherwise stated.

A pressure-sensitive adhesive is a viscoelastic adhesive which sets to form a film that at room temperature (20° C.) remains permanently tacky and adhesive in the dry state. Adhesion to substrates is effected immediately by gentle pressure.

The text below occasionally uses the designation "(meth) acrylic" or "(meth)acrylate" and similar designations as an abbreviating notation for "acrylic or methacrylic" or "acrylate or methacrylate". In the designation Cx-alkyl (meth)acrylate and analogous designations, x denotes the number of carbon atoms in the alkyl group.

A one-component adhesive is an adhesive to which no further component is added before use and which is storage-stable, wherein storage for 5 days at 20° C. results in a change in viscosity of preferably less than 100% based on the initial viscosity. The proportion of coagulate formation (removable with a 250 μm mesh filter) preferably does not exceed 5% by weight based on the solids content of the dispersion. Viscosity is measured with a cone-and-plate rotational viscometer (for example "MCR 301" rheometer from Anton Paar, measurement setup CP25-1-SN12203) at 23° C., constant shear rate 1 s$^{-1}$, gap width d=0.05 mm.

The glass transition temperature is determined by differential scanning calorimetry (ASTM D 3418-08, midpoint temperature). The glass transition temperature of the polymer in the polymer dispersion is the glass transition temperature obtained when evaluating the second heating curve (heating rate 20° C./min).

The gel content is measured by producing a polymer film from a polymer dispersion and drying it for one day at room temperature (20° C.) and 4 days at 50° C. The film is subsequently admixed with 99 times the mass of methyl ethyl ketone and stored for 4 days at room temperature. The mixture is filtered through a tared 125 μm Perlon filter, the filter is dried at room temperature until free from solvent and then dried at 50° C. for a further hour. The gel content is the proportion insoluble in methyl ethyl ketone determined by reweighing.

The (total) gel content $gel_{tot}$ of the pressure-sensitive adhesive polymer is determined after addition of the compound A and after film formation, drying and curing of the polymer film. The gel content $gel_0$ of the pressure-sensitive adhesive polymer based on covalent, irreversible crosslinking not effected by crosslinking of the keto or aldehyde groups of the polymer with compound A is determined after film formation and drying for a pressure-sensitive adhesive polymer without addition of the compound A. The gel content $gel_K$ of the pressure-sensitive adhesive polymer based on crosslinking of the keto or aldehyde groups of the polymer with compound A is the difference between $gel_{tot}$ and $gel_0$, i.e. $gel_K = gel_{tot} - gel_0$.

The total gel content $gel_{tot}$ may additionally optionally comprise a further proportion of gel content $gel_M$ based on a reversible crosslinking via metal salts.

In this case $gel_{tot} = gel_0 + gel_K + gel_M$.

This reversible crosslinking is not effected via covalent bonds but rather via ionic bonds or complex formation between acid groups of the polymer and at least divalent metal cations. The gel content $gel_M$ based on a reversible crosslinking via metal salts is for example from 0% to 40% by weight, from 0% to 20% by weight or from 0% to 10% by weight, preferably 0% by weight.

The metal salt crosslinking may be effected by addition of suitable metal salts after the polymerization. Suitable metal salts are for example those comprising the metal cations $Al^{3+}$, $Zn^{2+}$, $Ti^{4+}$, $Ca^{2+}$, $Fe^{2+}$, $Fe^{3+}$ and $Zr^{4+}$. Suitable counterions are, for example, acetylacetonates, hydroxides, oxalates, lactate, glycinate, acetate and also carboxylate groups or acrylate oligomers comprising 2-(methacryloyloxy)ethylacetoacetate groups having a molar mass of up to 50 000 g/mol. Suitable metal salts are, for example, aluminum acetylacetonate $Al(acac)_3$, titanium diisopropoxide bis (acetylacetonate) $Ti(acac)_2 OiPr_2$, diammonium bis[carbonato-O]-dihydroxyzirconate (Bacote® 20), iron (II)oxalate, calcium hydroxide or zinc hydroxide, for example $Zn(OH)_2/NH_3$. The metal salt is preferably selected from zinc salts and aluminum salts, preferably the acetylacetonates, in particular $Al(acac)_3$. Preferred metal salts have a water solubility of less than 10 g/l (at 25° C.).

The metal salt crosslinking may also be effected by direct incorporation of metal salts during the emulsion polymerization by copolymerization with suitable organometallic comonomers. The amount of such organometallic comonomers is preferably from 0% to 3% by weight, for example from 0.1% to 2.5% by weight, based on the sum of all monomers. Suitable organometallic comonomers are, for example aluminum acrylate Al(AS)$_3$, aluminum methacrylate Al(MAS)$_3$, zinc acrylate Zn(AS)$_2$, zinc methacrylate Zn(MAS)$_2$, titanium(IV) acrylate and titanium(IV) methacrylate. It is preferable when no organometallic comonomers are employed.

The amount of soft (meth)acrylic ester monomer (i) is at least

60% by weight, preferably at least 65% by weight, for example 65% to 94% by weight or 80% to 93% by weight. The soft monomers (i) are preferably selected from acrylic esters, in particular from C2- to C10-alkyl acrylates, or from $C_4$- to $C10_{10}$-alkyl acrylates or from $C_4$- to $C_8$-alkyl acrylates. Suitable examples include ethyl acrylate, n-butyl acrylate, n-hexyl acrylate, heptyl acrylate, octyl acrylate and 2-ethylhexyl acrylate and also mixtures of these monomers. Preference is given to ethyl acrylate, n-butyl acrylate and 2-ethylhexyl acrylate and mixtures thereof, particularly preferably n-butyl acrylate and 2-ethylhexyl acrylate and mixtures thereof.

The pressure-sensitive adhesive polymer is produced from a further monomer type (ii). The monomer type (ii) may be present in an amount of 0.1% to 10% by weight, preferably 0.2% to 8% by weight, or 0.5% to 6% by weight based on the total amount of the monomers employed to produce the polymer. Monomers (ii) are monomers having at least one acid group (acid monomers), i.e. ethylenically unsaturated acids or ethylenically unsaturated acid anhydrides, and are polymerizable by free-radical polymerization. Suitable acid monomers are, for example, ethylenically unsaturated carboxylic acids, ethylenically unsaturated sulfonic acids and vinylphosphonic acid. Preferably employed as ethylenically unsaturated carboxylic acids are alpha,beta-monoethylenically unsaturated mono- and dicarboxylic acids comprising 3 to 6 carbon atoms in the molecule. Examples thereof are acrylic acid, methacrylic acid, itaconic acid, maleic acid, fumaric acid, crotonic acid, vinylacetic acid and vinyllactic acid. Examples of suitable ethylenically unsaturated sulfonic acids include vinylsulfonic acid, styrenesulfonic acid, acrylamidomethylpropanesulfonic acid, sulfopropyl acrylate and sulfopropyl methacrylate. Acrylic acid, methacrylic acid, itaconic acid and mixtures thereof are preferred and methacrylic acid is particularly preferred.

The pressure-sensitive adhesive polymer is produced inter alia from styrene. Styrene (iii) is employed in an amount of at least 5% and less than 20% by weight, preferably from 6% to 19% by weight, or from 7% to 18% by weight, based on the sum of the monomers.

The pressure-sensitive adhesive polymer is produced from at least one ethylenically unsaturated compound K having at least one functional group selected from keto groups and aldehyde groups. The amount of monomers K is 0.3% to not more than 5% by weight, preferably 0.3% to not more than 4% by weight or 0.4% to not more than 3% by weight, based on the total amount of monomers. Compounds K are for example acrolein, methacrolein, vinyl alkyl ketones having 1 to 20, preferably 1 to 10, carbon atoms in the alkyl radical, formylstyrene, alkyl (meth)acrylates having one or two keto or aldehyde groups, or one aldehyde and one keto group in the alkyl radical, wherein the alkyl radical preferably comprises altogether 3 to 10 carbon atoms, for example (meth)acryloxyalkylpropanals, such as are described for example in DE-A 2 722 097. Also suitable are furthermore N-oxoalkyl(meth)acrylamides such as are known for example from DE-A 2 061 213 or DE-A 2 207 209, for example those of formula 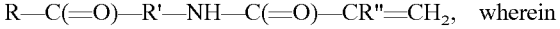, wherein R and R" independently of one another represent hydrogen or a hydrocarbon group (preferably alkyl) having 1 to 10 carbon atoms and R' represents a hydrocarbon group (preferably alkylene) having 2 to 15 carbon atoms. Particular preference is given to acetoacetyl(meth)acrylate, acetoacetoxyethyl(meth)acrylate and especially diacetoneacrylamide.

It is optionally possible to employ further monomers (v) distinct from the monomers (i) to (iv). The further monomers (v) are copolymerizable, ethylenically unsaturated compounds. The optional monomers (v) are preferably employed in amounts of 0% to not more than 10% by weight, of 0.1% to 10% by weight, of 1% to 10% by weight or of 1% to not more than 8% by weight, based on the sum of the monomers. The monomers (v) are preferably monomers distinct from the monomers (i) to (iv) selected from the group consisting of C1 to C20 alkyl (meth)acrylates, monomers comprising hydroxyl groups, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds and (meth)acrylamides or mixtures of these monomers. Further monomers additionally include phenyloxyethyl glycol mono(meth)acrylate, glycidyl (meth)acrylate, aminoalkyl (meth)acrylates, for example 2-aminoethyl (meth)acrylate. Alkyl groups preferably have from 1 to 20 carbon atoms. $C_1$-$C_{20}$-alkyl (meth)acrylates have 1-20 carbon atoms in the alkyl groups. $C_1$-$C_{10}$-hydroxyalkyl (meth) acrylates have 1-10 carbon atoms in the hydroxyalkyl groups.

C1 to C20 alkyl (meth)acrylates are for example methyl acrylate and methyl methacrylate. Monomers comprising hydroxyl groups are for example $C_1$-$C_{10}$-hydroxyalkyl (meth)acrylates. Vinyl esters of carboxylic acids having 1 to 20 carbon atoms are for example vinyl acetate, vinyl laurate, vinyl stearate, vinyl propionate and vinyl versatate. Contemplated vinylaromatic compounds include vinyltoluene, alpha- and p-methylstyrene, alpha-butylstyrene, 4-n-butylstyrene, 4-n-decylstyrene. Examples of nitriles are acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether or vinyl isobutyl ether. Preference is given to vinyl ethers of alcohols comprising 1 to 4 carbon atoms. Suitable hydrocarbons having 4 to 8 carbon atoms and two olefinic double bonds are, for example, butadiene, isoprene and chloroprene.

Preferred as further monomers (v) are methyl acrylate, methyl methacrylate, vinyl esters, in particular vinyl acetate, and mixtures thereof and also C2 to C10 hydroxyalkyl (meth)acrylates. Very particularly preferred are methyl acrylate, methyl methacrylate, vinyl acetate and hydroxypropyl acrylate and also mixtures of these monomers.

Excepted from the monomers for producing the pressure-sensitive adhesive polymer are monomers having at least two non-conjugated polymerizable vinyl groups, in particular those that may lead to branchings or crosslinkings that elevate gel content. Such excluded monomers are for example polyfunctional acrylates or polyfunctional methacrylates, in particular alkanediol di(meth)acrylates having for example 2 to 8 carbon atoms in the alkane group, in particular ethylene glycol diacrylate, propylene glycol diacrylate, polyethylene glycol diacrylate, hexanediol diacrylate, ethylene glycol dimethacrylate, diethylene glycol dimethacrylate, 1,3-butaneglycol dimethacrylate, tri(meth) acrylates, in particular trimethylolpropane trimethacrylates, ethoxylated trimethylolpropane triacrylate, pentaerythritol triacrylates, pentaerythritol trimethacrylate or trimethylolpropane trimethacrylate; divinyl compounds, in particular divinyl esters such as for example divinylbenzene, divinyl succinate, divinyl adipate, divinyl maleate, divinyl oxalate, divinyl malonate or divinyl glutarate.

The glass transition temperature of the polymer prior to crosslinking of the keto or aldehyde groups of the polymer with compound A is below 10° C., preferably below −15° C. and preferably above −40° C., in particular from −35° C. to below −15° C. Through targeted variation of monomer type and quantity, those skilled in the art are able according to the invention to produce aqueous polymer compositions whose polymers have a glass transition temperature in the desired range. Orientation is possible using the Fox equation. According to Fox (T. G. Fox, Bull. Am. Phys. Soc. 1956 [Ser. II] 1, page 123 and according to Ullmann's Encyclopedia of Industrial Chemistry, vol. 19, page 18, 4th edition, Verlag Chemie, Weinheim, 1980), the glass transition temperature of copolymers is given to a good approximation by:

$$1/T_g = x^1/T_g^1 + x^2/T_g^2 + \ldots x^n/T_g^n,$$

wherein $x^1$, $x^2$, .... $x^n$ are the mass fractions of the monomers 1, 2, .... n and $T_g^1$, $T_g^2$, ... $T_g^n$ are the glass transition temperatures in degrees Kelvin of the polymers constructed from only one of the monomers 1, 2, .... n at a time. The $T_g$ values for the homopolymers of the majority of monomers are known and are listed for example in Ullmann's Encyclopedia of Industrial Chemistry, vol. 5, vol. A21, page 169, VCH Weinheim, 1992; further sources for glass transition temperatures of homopolymers are, for example, J. Brandrup, E. H. Immergut, Polymer Handbook, 1$^{st}$ Ed., J. Wiley, New York 1966, 2$^{nd}$ Ed. J. Wiley, New York 1975, and 3$^{rd}$ Ed. J. Wiley, New York 1989.

The polymerization may employ chain transfer agents. It is preferable when no chain transfer agents are employed. When chain transfer agents are employed they are preferably employed in amounts of at least 0.01 parts by weight of chain transfer agent per 100 parts by weight of monomers, for example of 0.01 to 5 parts by weight, or of 0.01 to 3 parts by weight, preferably of 0.01 to 0.75 parts by weight, to 100 parts by weight of the monomers to be polymerized. This makes it possible to control/reduce the molar mass of the emulsion polymer through a chain termination reaction. The chain transfer agents are bonded to the polymer in this procedure, generally to the chain end. The addition may be carried out during the polymerization continuously or in stages.

Suitable chain transfer agents are for example organic compounds comprising sulfur in bonded form (for example compounds having a thiol group), aliphatic and/or araliphatic halogen compounds, aliphatic and/or aromatic aldehydes, unsaturated fatty acids (for example oleic acid), dienes having non-conjugated double bonds (for example divinylmethane, terpinols or vinylcyclohexene), hydrocarbons having easily abstractable hydrogen atoms (for example toluene), organic acids or salts thereof (for example formic acid, sodium formate, ammonium formate), alcohols (for example isopropanol) and phosphorus compounds (for example sodium hypophosphite). It is alternatively possible to employ compatible mixtures of the abovementioned chain transfer agents. The chain transfer agents are generally compounds of low molecular mass, having a molar weight of less than 2000, in particular less than 1000 g/mol. It is advantageous when a sub-amount or the total amount of the chain transfer agents is supplied to the aqueous reaction medium before initiation of the free-radical polymerization. In addition, a sub-amount or the total amount of the free-radical chain-transferring compound may advantageously also be supplied to the aqueous reaction medium together with the monomers during the polymerization.

Organic compounds having a thiol group are, for example, primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols such as 2-hydroxyethanethiol, aromatic thiols such as benzenethiol, ortho-, meta-, or para-methylbenzenethiol, mercaptoalkyl-carboxylic acid esters, for example C2- to C4-carboxylic acids having 1 to 18 carbon atoms in the alkyl group, for example 2-mercaptoethyl propionate, and all other sulfur compounds described in Polymer handbook 3rd edition, 1989, J. Brandrup and E. H. Immergut, John Wiley & Sons, Section II, pages 133 to 141. Preferred organic compounds comprising sulfur in bonded form are in particular tert-butyl mercaptan, ethyl thioglycolate, mercaptoethanol, mercaptopropyltrimethoxysilane, tert-dodecyl mercaptan, thiodiglycol, ethylthioethanol, di-n-butyl sulfide, 2-isopropyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid and thiourea. Particularly preferred thio compounds are tert-butyl mercaptan, ethyl thioglycolate, mercaptoethanol, mercaptopropyltrimethoxysilane, 2-ethylhexyl thioglycolate (EHTG), isooctyl 3-mercaptopropionate (IOMPA) or tert-dodecyl mercaptan (tDMK).

Aliphatic and/or araliphatic halogen compounds are, for example, n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide. Aliphatic and/or aromatic aldehydes are for example formaldehyde, acetaldehyde, propionaldehyde and/or benzaldehyde.

The pressure-sensitive adhesive composition comprises at least one compound A comprising at least two, in particular 2 to 5, functional groups capable of undergoing a crosslinking reaction with keto groups or with aldehyde groups. Compounds capable of undergoing a crosslinking reaction with the keto or aldehyde groups are for example compounds having hydrazide, hydroxylamine, oxime ether or amino groups. Suitable compounds having hydrazide groups are for example polycarboxylic acid hydrazides having a molar weight of preferably up to 500 g/mol. Preferred hydrazide compounds are dicarboxylic dihydrazides having preferably 2 to 10 carbon atoms. Examples include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. Particular preference is given to adipic dihydrazide, sebacic dihydrazide and isophthalic dihydrazide. Examples of suitable compounds having amino groups are ethylenediamine, propylenediamine, tetramethylenediamine, pentamethylenediamine, hexamethylenediamine, diethylenetriamine, triethylenetramine, polyethyleneimines, partly hydrolyzed polyvinylformamides, ethylene oxide and propylene oxide adducts such as the "Jeffamines", cyclohexanediamine and xylylenediamine.

Compound A is preferably a dicarboxylic acid dihydrazide having 2 to 10 carbon atoms and monomer (iv) is selected from acetoacetyl (meth)acrylate, acetoacetoxyethyl (meth)acrylate and diacetone acrylamide. It is particularly preferable when compound A is adipic acid dihydrazide and monomer (iv) is diacetone acrylamide.

The crosslinking of the keto or aldehyde groups of the adhesive polymer may optionally be delayed, for example by using hydrazines as compound A and addition of volatile carbonyl compounds or by using hydrazones formed from hydrazides and volatile carbonyl compounds as compound A. Preferred volatile carbonyl compounds have a boiling point of below 100° C., in particular below 70° C. Preference is given to ketones, especially acetone and methyl ethyl ketone. Preferred usage amounts of the volatile carbonyl compounds for retarding crosslinking are not more than 1% by weight (sum of free carbonyl compound and hydrazone-bonded carbonyl compound, based on the total composition). For applications where the lowest possible content of volatile organic compounds (VOC) is important the pressure-sensitive adhesive composition preferably comprises no volatile carbon compounds.

The molar ratio of the keto- or aldehyde-reactive groups of the compound A to the keto- and aldehyde groups of the monomer (iv) is preferably from 1:10 to 2:1, in particular 1:5 to 2:1, particularly preferably 1:2 to 2:1 and very particularly preferably 1:1.3 to 1.3:1. Equimolar amounts of the keto- or aldehyde-reactive groups and the keto and/or aldehyde groups are especially preferred.

The compound having the functional groups may be added to the composition or to the dispersion of the polymer at any point in time. In the aqueous dispersion there is not yet any crosslinking with the keto or aldehyde groups. Crosslinking occurs on the coated substrate only in the course of drying.

It has been found that the adhesive properties may be positively influenced via the amount and type of gel content. The total gel content $gel_{tot}$ is composed of a gel content $gel_O$ based on covalent, irreversible crosslinking not effected by crosslinking of the keto or aldehyde groups of the polymer with compound A and a gel content $gel_K$ based on a crosslinking of the keto or aldehyde groups of the polymer with compound A, i.e. $gel_{tot}=gel_O+gel_K$.

The total gel content $gel_{tot}$ may additionally optionally comprise a further proportion of gel content $gel_M$ based on a reversible crosslinking via metal salts.

In this case $gel_{tot}=gel_O+gel_K+gel_M$.

After film formation on a substrate the total gel content $gel_{tot}$ is at least 80% by weight, preferably at least 85% by weight, based on a polymer film produced from the pressure-sensitive adhesive polymer.

The gel content $gel_K$ based on a crosslinking of the keto or aldehyde groups of the polymer with compound A is at least 30% by weight, preferably at least 40% by weight or at least 45% by weight or particularly preferably at least 50% by weight, based on a polymer film produced from the pressure-sensitive adhesive polymer. $Gel_k$ may be adjusted for example via the amount of the keto- and aldehyde groups of the polymer and the amount of the compound A.

The gel content $gel_O$ based on covalent, irreversible crosslinking not effected by crosslinking of the keto or aldehyde groups of the polymer with compound A may be 0% to not more than 50% by weight, preferably not more than 40% by weight or not more than 30% by weight, for example more than 0% to 40% by weight or 1% to 30% by weight, based on the solids content. $Gel_O$ may be adjusted through use of small amounts of chain transfer agents and/or by varying the amount of styrene. It is preferable when no chain transfer agent is used.

A particularly preferred pressure-sensitive adhesive composition in the form of an aqueous polymer dispersion comprises at least one pressure-sensitive adhesive polymer formed by emulsion polymerization from
(i) at least 65% by weight, based on the sum of the monomers, of at least one acrylic acid ester monomer selected from n-butyl acrylate and 2-ethylhexyl acrylate,
(ii) 0.5% to 8% by weight, based on the sum of the monomers, of at least one acid monomer selected from acrylic acid, methacrylic acid and itaconic acid,
(iii) 5% to 19% by weight, based on the sum of the monomers, of styrene,
(iv) 0.3% to 5% by weight, based on the total amount of monomers, of at least one ethylenically unsaturated compound having at least one keto group selected from the group consisting of acetoacetyl (meth)acrylate, acetoacetoxyethyl (meth)acrylate and diacetone acrylamide
(v) 0% to 10% by weight, based on the sum of the monomers, of monomers distinct from the monomers (i) to (iv) selected from the group consisting of C1 to C20 alkyl (meth)acrylates, monomers comprising hydroxyl groups, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds,
wherein the pressure-sensitive adhesive polymer has a gel content $gel_{tot}$ of at least 80% by weight based on the polymer film,
wherein the gel content $gel_K$ of the pressure-sensitive adhesive polymer based on crosslinking of the keto or aldehyde groups of the polymer with compound A is at least 50% by weight,
and the gel content $gel_O$ of the pressure-sensitive adhesive polymer based on covalent, irreversible crosslinking not based on crosslinking of the keto or aldehyde groups of the polymer with compound A is more than 0% and up to 30% by weight,
and wherein the glass transition temperature of the pressure-sensitive adhesive polymer is below −15° C.

The polymer dispersions employed according to the invention are obtainable by free-radical emulsion polymerization of ethylenically unsaturated, free-radically polymerizable compounds (monomers). The emulsion polymerization comprises polymerizing ethylenically unsaturated compounds (monomers) in water using ionic and/or nonionic emulsifiers and/or protective colloids or stabilizers as surface-active compounds to stabilize the monomer droplets and the polymer particles subsequently formed from the monomers. The surface-active substances are typically used in amounts of 0.1 to 10 parts by weight, preferably 0.2 to 5 parts by weight, based on 100 parts by weight of the monomers to be polymerized.

A detailed description of suitable protective colloids can be found in Houben-Weyl, Methoden der organischen Chemie [Methods of Organic Chemistry], volume XIV/1, Makromolekulare Stoffe [Macromolecular Materials], Georg-Thieme-Verlag, Stuttgart, 1961, p. 411 to 420. Useful emulsifiers include anionic, cationic and also nonionic emulsifiers. As surface-active substances it is preferable to employ emulsifiers whose molecular weight is typically below 2000 g/mol in contrast with the protective colloids. When mixtures of surface-active substances are used, the individual components must of course be compatible with one another; in case of doubt, this may be checked on the basis of a few preliminary experiments. Preference is given to using anionic and nonionic emulsifiers as surface-active substances. Customary accompanying emulsifiers are for example ethoxylated fatty alcohols (EO degree: 3 to 50, alkyl radical: $C_8$ to $C_{36}$), ethoxylated mono-, di- and trialkylphenols (EO degree: 3 to 50, alkyl radical: $C_4$ to $C_9$), alkali metal salts of dialkyl esters of sulfosuccinic acid and alkali metal and ammonium salts of alkyl sulfates (alkyl radical: $C_8$ to $C_{12}$), of ethoxylated alkanols (EO degree: 4 to 30, alkyl radical: $C_{12}$ to $C_{18}$), of ethoxylated alkylphenols (EO degree: 3 to 50, alkyl radical: $C_4$ to $C_9$), of alkylsulfonic acids (alkyl radical: 012 to 018) and of alkylarylsulfonic acids (alkyl radical: $C_9$ to $C_{18}$).

Further suitable emulsifiers are compounds of the general formula

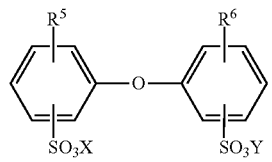

wherein R5 and R6 are hydrogen or C4- to C14-alkyl and are not simultaneously hydrogen, and X and Y may be alkali metal ions and/or ammonium ions. R5, R6 are preferably linear or branched alkyl radicals having 6 to 18 carbon atoms or hydrogen and in particular having 6, 12 and 16 carbon atoms, wherein R5 and R6 are not both simultaneously hydrogen. X and Y are preferably sodium, potassium or ammonium ions, wherein sodium is particularly preferred. Compounds in which X and Y are sodium, R5 is a branched alkyl radical having 12 carbon atoms and R6 is hydrogen or R5 are particularly advantageous. Often employed are industrial mixtures comprising a proportion of 50% to 90% by weight of the monoalkylated product. Commercially available products of suitable emulsifiers are for example Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. Ionic emulsifiers or protective colloids are preferred for the present invention. Particular preference is given to ionic emulsifiers, in particular salts and acids, such as carboxylic acids, sulfonic acids and sulfates, sulfonates or carboxylates. Also employable in particular are mixtures of ionic and nonionic emulsifiers.

The polymerization may also be carried out in the presence of a protective colloid. Protective colloids are polymeric compounds which upon solvation bind large quantities of water and are capable of stabilizing dispersions of water-insoluble polymers. In contrast to emulsifiers, they generally do not lower the interfacial surface tension between polymer particles and water. The number-average molecular weight of protective colloids is above 1000 g/mol for example.

The emulsion polymerization may be initiated using water-soluble initiators. Water-soluble initiators are for example ammonium salts and alkali metal salts of peroxodisulfuric acid, for example sodium peroxodisulfate, hydrogen peroxide or organic peroxides, for example tert-butyl hydroperoxide. Also suitable as initiators are so-called reduction-oxidation (redox) initiator systems. Redox initiator systems consist of at least one generally inorganic reducing agent and an inorganic or organic oxidizing agent. The oxidizing component is, for example, the emulsion polymerization initiators already mentioned hereinabove. The reductant components are for example alkali metal salts of sulfurous acid, such as for example sodium sulfite, sodium hydrogensulfite, alkali metal salts of disulfurous acid such as sodium disulfite, bisulfite addition compounds of aliphatic aldehydes and ketones, such as acetone bisulfite or reducing agents such as hydroxymethanesulfinic acid and the salts thereof, or ascorbic acid. The redox initiator systems may be employed with co-use of soluble metal compounds whose metallic component may appear in a plurality of valence states. Typical redox initiator systems are, for example, ascorbic acid/iron(II) sulfate/sodium peroxydisulfate, tert-butyl hydroperoxide/sodium disulfite, tert-butyl hydroperoxide/sodium hydroxymethanesulfinic acid. The individual components, for example the reductant component, may also be mixtures, for example a mixture of the sodium salt of hydroxymethanesulfinic acid and sodium disulfite.

The recited initiators are generally employed in the form of aqueous solutions, the lower concentration limit being determined by the amount of water acceptable in the dispersion and the upper concentration limit being determined by the solubility in water of the particular compound.

The concentration of the initiators is generally from 0.1 to 30 wt %, preferably from 0.5 to 20 wt % and more preferably from 1.0 to 10 wt % based on the monomers to be polymerized. It is also possible to use two or more different initiators in the emulsion polymerization.

The emulsion polymerization is generally carried out at 30° C. to 130° C., preferably at 50° C. to 95° C. The polymerization medium may consist either only of water or of mixtures of water and liquids miscible therewith such as methanol. Preference is given to using solely water.

The emulsion polymerization may be carried out either as a batch process or in the form of a feed process, including the staged and gradient operating modes of a feed process. Preference is given to the feed process in which a portion of the polymerization batch is initially charged, heated to the polymerization temperature and incipiently polymerized before the remainder of the polymerization batch is supplied, typically via a plurality of spatially separate feeds, one or more of which comprise the monomers in pure form or in emulsified form, continuously, in stages or with superposition of a concentration gradient while maintaining the polymerization in the polymerization zone.

It is also possible in the polymerization to initially charge a polymer seed for more effective adjustment of particle size for example. The polymerization is preferably carried out with seed control, i.e., in the presence of polymer seed (seed latex). Seed latex is an aqueous dispersion of finely divided polymer particles having an average particle diameter of preferably 20 to 40 nm. Seed latex is used in an amount of preferably 0.01 to 0.5 parts by weight, particularly preferably of 0.03 to 0.3 parts by weight, based on 100 parts by weight of monomers. A latex based on polystyrene or based on polymethyl methacrylate is suitable for example. One preferred seed latex is polystyrene seed.

The manner in which the initiator is added to the polymerization vessel over the course of the free-radical aqueous emulsion polymerization is known to those of ordinary skill in the art. It may be either initially charged to the polymerization vessel in its entirety or employed continuously or in a staged manner at the rate of its consumption over the course of the free-radical aqueous emulsion polymerization. This specifically depends on the chemical nature of the initiator system and on the polymerization temperature. Preference is given to initially charging a portion and supplying the remainder to the polymerization zone at the rate of its consumption. To remove the residual monomers, initiator is typically also added after termination of the actual emulsion polymerization, i.e. after a monomer conversion of at least 95%. In the feed process, the individual components may be added to the reactor from above, from the side or from below through the reactor floor.

The emulsion polymerization generally affords aqueous dispersions of the polymer having solids contents of from 15% to 75% by weight, preferably from 40% to 75% by weight, or 40% to 60% by weight, particularly preferably not less than 50% by weight.

Dispersions having a very high solids content are preferred for a high reactor space/time yield. In order that solids contents of >60 wt % may be achieved, a bi- or polymodal particle size should be established since otherwise the viscosity becomes too high and the dispersion is difficult to handle. A new generation of particles may be produced, for example, by addition of seed (EP 81083), by addition of excess emulsifier amounts or by addition of miniemulsions. A further advantage associated with low viscosity at high solids content is improved coating characteristics at high solids contents. Production of (a) new particle generation(s) may be effected at any point in time. It is guided by the particle-size distribution that is sought for a low viscosity. The polymer thus produced is preferably used in the form of its aqueous dispersion. The size distribution of the dispersion particles may be monomodal, bimodal or multimodal.

The neutralization of acid groups of the polymer is preferably carried out by feeding of a neutralizing agent during or after the polymerization, wherein the acid groups are fully or partially neutralized by feeding of a base. The neutralizing agent may be added for example in a separate feed simultaneously with the feeding of the monomer mixture. After feeding of all monomers it is preferable when the amount of neutralizing agent necessary for neutralization of at least 10%, preferably 10% to 100% or 25% to 90%, of acid equivalents is present in the polymerization vessel. A particularly preferred neutralizing agent is ammonia. The pH of the polymer dispersion is preferably adjusted to a pH greater than 4.5, more particularly to a pH of between 5 and 8.

The pressure-sensitive adhesive composition comprises at least one tackifier (tackifying resin). The amount of tackifier is preferably from 5 to 40 parts by weight based on 100 parts by weight of adhesive polymer. A tackifier is a polymeric or oligomeric additive for adhesive polymers or generally for elastomers which increases their autoadhesion (tack, inherent tack, self-adhesion) so that after short, light contact pressure they adhere to surfaces firmly. Tackifiers include for example natural resins, such as colophony resins and the derivatives thereof formed by disproportionation or isomerization, polymerization, dimerization or hydrogenation or terpene resins. These may be in their salt form (with for example monovalent or polyvalent counterions (cations)) or preferably in their esterified form. Alcohols used for esterification may be monohydric or polyhydric. Examples include methanol, ethanediol, diethylene glycol, triethylene glycol, 1,2,3-propanethiol, pentaerythritol. Further employable are also hydrocarbon resins, for example coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, alpha-methylstyrene, vinyltoluene. Tackifiers are known for example from Adhesive Age, July 1987, pages 19-23 or Polym. Mater. Sci. Eng. 61 (1989), pages 588-592.

Polyacrylates having a low molar weight are increasingly also being used as tackifiers. These polyacrylates preferably have a weight-average molecular weight Mw less than 50 000, in particular less than 30 000. The polyacrylates preferably consist to an extent of at least 60% by weight, in particular at least 80% by weight, of $C_1$-$C_8$ alkyl (meth)acrylates. Suitable tackifiers include for example the low-molecular-weight polymers and oligomers described in WO 2013/117428 having a weight-average molecular weight of less than 50 000 and a glass transition temperature of not less than −40° C. to not more than 0° C., preferably of not less than −35° C. to not more than 0° C., producible by emulsion polymerization in the presence of at least one molecular weight regulator and producible from a monomer mixture comprising at least 40% by weight of at least one C1- to C20-alkyl (meth)acrylate.

Preferred tackifiers include natural or chemically modified colophony resins. Colophony resins consist predominantly of abietic acid or abietic acid derivatives or hydrogenated derivatives thereof. The tackifiers may be added to the polymer dispersion in simple fashion. The tackifiers themselves are preferably in the form of an aqueous dispersion. The amount by weight of the tackifiers is preferably 5 to 100 parts by weight, particularly preferably 10 to 50 parts by weight, based on 100 parts by weight of polymer (solid/solid).

The pressure-sensitive adhesive composition may also comprise further additives, for example fillers, dyes, leveling agents, thickeners (preferably associative thickeners), defoamers, crosslinkers, plasticizers, pigments or wetting agents. For better wetting of surfaces the pressure-sensitive adhesives may include in particular wetting auxilliaries (wetting agents), for example fatty alcohol ethoxylates, alkylphenol ethoxylates, nonylphenol ethoxylates, polyoxyethylenes/polyoxypropylenes or sodium dodecylsulfonates. The amount of additives is generally 0.05 to 5 parts by weight, especially 0.1 to 3 parts by weight, per 100 parts by weight of adhesive polymer (solid).

The pressure-sensitive adhesive composition preferably comprises
60-95 parts by weight of pressure-sensitive adhesive polymer,
5-40 parts by weight of tackifier and
optionally 0-10 parts by weight of further constituents such as for example the abovementioned wetting agents, thickeners, defoamers etc.

The pressure-sensitive adhesive composition is preferably a one-component pressure-sensitive adhesive. One-component adhesives are adhesives to which no external crosslinking agent (for example isocyanate crosslinker) is added immediately before use.

After drying, the pressure-sensitive adhesive composition forms a film having a tack of not less than 10 N/25 mm measured as loop tack relative to a steel surface (adhesive applied at an application rate of 60 g/m² on a 36 µm-thick polyethylene terephthalate film, measured relative to steel at 23° C. and 50% relative humidity at a tearoff speed of 300 mm/min, see examples for details).

After drying, the pressure-sensitive adhesive composition forms a film having a peel strength of preferably greater than 5 N/25 mm relative to a polyethylene surface (measured at an application rate of 60 g/m², applied on a 36 µm-thick polyethylene terephthalate film, measured relative to polyethylene at 23° C. and 50% relative humidity at a tearoff speed of 300 mm/min, see examples for details).

The pressure-sensitive adhesive composition may be used to produce self-adhesive articles. The articles are at least partially coated with the pressure-sensitive adhesive. The adhesive properties may be adjusted such that the self-adhesive articles are removable again after bonding. The self-adhesive articles may be adhesive labels, adhesive tapes or adhesive films for example. Suitable carrier materials are for example paper, plastic films and metal foils. The inventive self-adhesive tapes may be tapes of the abovementioned substances coated on one or both sides. The inventive self-adhesive labels may be labels made of paper or a thermoplastic film. Adhesive tapes made of thermoplastic film are particularly preferred. Contemplated thermoplastic films include for example films made of polyolefins (for example polyethylene, polypropylene), polyolefin copolymers, films made of polyesters (for example polyethylene terephthalate), polyvinyl chloride or polyacetate. The surfaces of the thermoplastic polymer films have preferably been corona-treated. Foamed carriers are also contemplated. The labels have been coated with adhesive on one side. Preferred substrates for the self-adhesive articles are paper and polymer films.

The self-adhesive articles have been at least partially coated with a pressure-sensitive adhesive according to the invention on at least one surface. The adhesive may be applied to the articles by customary methods such as roller application, knife coating or spreading. The application rate is preferably 0.1 to 300 g, more preferably 2 to 150 g, of solid per m². Application is generally followed by a drying step for removal of the water/the solvents. The water may be removed by drying at 50° C. to 150° C. for example. The thus obtained, coated substrates are used for example as self-adhesive articles, such as adhesive labels, adhesive tapes or adhesive films. To this end the carriers may be cut into adhesive tapes, labels or films before or after application of the adhesive. The side of the substrates coated with pressure-sensitive adhesive may be covered with a release paper, for example with a siliconized paper, for later use.

The substrates to which the self-adhesive articles may advantageously be applied may be metal, wood, glass, paper or plastic for example. The self-adhesive articles are especially suitable for bonding to packaging surfaces, cardboard boxes, plastic packaging, books, windows, vapor barriers, motor vehicle bodies, tires or vehicle body parts.

The invention further relates to the use of the pressure-sensitive adhesive composition described hereinabove for producing adhesive labels, adhesive tapes or adhesive films.

The invention further relates to self-adhesive articles coated with a pressure-sensitive adhesive composition described hereinabove.

The invention further relates to a process for producing a self-adhesive article by coating a substrate with a pressure-sensitive adhesive composition described hereinabove.

EXAMPLES

The following input materials and abbreviations are used:
EHA: 2-ethylhexyl acrylate
BA: n-butyl acrylate
MA methyl acrylate
S: styrene
MAA methacrylic acid
AA acrylic acid
DAAM diacetoneacrylamide
ADDH adipic acid dihydrazide
BDA-2 butanediol diacrylate (crosslinkers for covalent, irreversible crosslinking)
tDMK tert-dodecylmercaptan
pphm parts by weight per 100 parts by weight of monomers (parts per hundred monomer)
SC standard conditions, 50% rel. humidity, 1 bar, 23° C.

The examples labeled V . . . are comparative examples, the examples labeled E . . . are inventive examples.

Performance Tests
Determination of Gel Content

The polymer dispersion to be investigated is used to produce polymer films. The polymer films are dried for 1 day at room temperature (20° C.) and subsequently dried for 4 days at 50° C. The dried film is admixed with 99 times the mass of methyl ethyl ketone. The immersed film is stored for 4 days at room temperature. This swollen or dissolved film is subsequently filtered off via a tared 125 µm Perlon filter. The filter is dried at room temperature until free from solvent. It is then dried for a further 1 hour at 50° C. and the gel fraction (solids fraction insoluble in methyl ethyl ketone remaining in the filter) is determined by weighing.

The total gel content $gel_{tot}$ of an adhesive polymer is the gel content after film formation on a substrate and comprises both the gel content formed during polymerization and the gel content formed by crosslinking of the keto groups of the polymer with compound A. To determine the total gel content the polymer dispersion is added to compound A (adipic acid dihydrazide) prior to film formation.

The gel content $gel_0$ based on covalent, irreversible crosslinking not effected by the crosslinking of the keto or aldehyde groups of the polymer with compound A is determined using polymer dispersions comprising no compound A (no adipic acid dihydrazide).

The gel content $gel_K$ based on crosslinking of the keto groups with compound A is the difference between the two abovementioned gel content measurements:

$$gel_K = gel_{tot} - gel_0.$$

Testing of Adhesive Properties

To test the adhesive properties the pressure-sensitive adhesives are coated at an application rate of about 60 g/m² onto Hostaphan® RN 36 (biaxially oriented film made of polyethylene terephthalate, 36 µm thickness) as the carrier and dried for 5 minutes at 90° C.

Unless otherwise stated, dispersion films crosslinked with ADDH are stored for 5 days under standard conditions (23° C., 50% relative humidity), while dispersion films not crosslinked with ADDH are stored for 24 h under standard conditions, before the adhesive properties are determined under standard conditions.

Quickstick (Loop Tack, Corresponding to FINAT Test Method FTM9)

Determining Quickstick (surface tack, also known as loop tack) generally comprises determining the force required for removal from a substrate of an adhesive applied to a carrier material by pressureless adhesive bonding onto the substrate at a defined tear-off speed, measured at 23° C. and 50% relative humidity. Test substrates are steel or polyethylene. A test strip of 25 mm in width and 250 mm in length is cut from the carrier coated with adhesive and stored for at least 16 hours under standard conditions (23° C., 50% relative humidity). Both ends of the test strip are folded over to about 1 cm in length with the adhesive side facing inward. The adhesive strip is used to form a loop with the adhesive side facing outward, and the two ends are brought together and clamped into the upper jaw of a tensile testing machine. The test substrate holder is clamped into the lower jaw. The adhesive strip loop is moved downward by the tensile testing machine at a speed of 300 mm/minute, thus bonding the adhesive side of the test strip to the substrate without additional pressure. The tensile testing machine is halted and immediately moved upward again when the bottom edge of the upper jaw is 40 mm above the substrate. The test result is reported in N/25 mm width. The maximum value on the display (Fmax) is read off as the measure of surface tack. An average of three individual results is taken.

Peel Test (Corresponding to FINAT Test Method FTM1)

Peel strength is a measure of adhesion measured at 23° C. and 50% relative humidity. In the determination of peel strength a 25 mm wide test strip is in each case bonded to a test specimen made of polyethylene or steel and rolled once with a 1 kg roller. One end is then clamped in the upper jaws of a tensile strain tester. The adhesive strip is removed from the test surface at 300 mm/min at an angle of 180°, i.e. the adhesive strip is bent and removed parallel to the test specimen and the force required therefor is measured. The measure for peel strength is the force in N/25 mm obtained as the average value from five measurements. The peel strength was determined 24 hours after bonding. The adhesive strength has fully developed after this time.

Shear Strength (Corresponding to FINAT Test Method FTM8)

Shear strength is a measure of cohesion measured at 23° C. and 50% relative humidity. The carrier coated with pressure-sensitive adhesive is cut into test strips of 25 mm or 12.5 mm in width. To determine shear strength the test strips are bonded to steel with a bonded area of 25×25 mm (measurements at 70° C.) or
12.5×12.5 mm (measurements under standard conditions) and rolled on once with a 1 kg roller, stored for 10 minutes (in standard conditions, 50% relative humidity, 1 bar, 23° C.) and subsequently subjected to hanging stress with a 1 kg weight (in standard conditions SC, 12.5×12.5 mm) or a 2 kg weight (at 70° C., 25×25 mm). The measure of shear strength is the time in minutes until the weight falls off; the average of 5 measurements is calculated in each case.

SAFT Test (Heat Resistance)

The test strips are bonded to AFERA steel with a bonded area of 25×25 mm, rolled 4 times with a 2 kg roller and, after a contact time of at least 16 hours, subjected to hanging stress with a 1 kg weight. During the subjection to hanging stress the test strips are continuously heated at a rate of 0.5° C./min starting from 23° C. The heating temperature achieved when the weight falls off is a measure of the heat resistance of the adhesive. The average of 3 measurements is calculated in each case.

Examples E1-E15 and V1-V8

Employed here are emulsion polymers produced from the monomers recited in table 1 and admixed with the tackifier Snowtack® 933 E (rosin ester dispersion) in a weight ratio of 75:25 (solids:solids polymer to tackifier). The reported amounts are parts by weight. The examples labeled V . . . are comparative examples, the examples labeled E . . . are inventive examples.

TABLE 1

Emulsion polymers

| Example | $Tg\ ^{2)}$ [° C.] | BA | EHA | S | MAA | DAAM | ADDH | $Gel_0$ [%] | $Gel_{tot}$ [%] | $Gel_k$ [%] |
|---|---|---|---|---|---|---|---|---|---|---|
| V1 | −28 | 85 | | 10 | 5 | — | — | 29 | 29 | 0 |
| V2 | −28 | 85 | | 10 | 4.75 | 0.25 | 0.0625 | 17 | 60 | 43 |
| V3 | −28 | 85 | | 10 | 4.75 | 0.25 | 0.075 | 17 | 70 | 53 |
| V4 | −28 | 85 | | 10 | 4.75 | 0.25 | 0.125 | 17 | 79 | 62 |
| E1 | −28 | 85 | | 10 | 4.5 | 0.5 | 0.25 | 19 | 87 | 68 |
| E2 | −28 | 85 | | 10 | 4.5 | 0.5 | 0.20 | 19 | 85 | 66 |
| E3 | −28 | 85 | | 10 | 4.5 | 0.5 | 0.15 | 19 | 80 | 61 |
| E4 | −28 | 85 | | 10 | 4.25 | 0.75 | 0.375 | 22 | 92 | 70 |
| E5 | −33 | 90 | | 5 | 4.5 | 0.5 | 0.15 | 29 | 81 | 52 |
| E6 | −33 | 90 | | 5 | 4.5 | 0.5 | 0.25 | 29 | 87 | 58 |
| E7 | −30 | 75 | 10 | 10 | 4.5 | 0.5 | 0.25 | 23 | 87 | 64 |
| E8 | −32 | 65 | 20 | 10 | 4.5 | 0.5 | 0.25 | 24 | 88 | 62 |
| V5 | −21 | 55 | 20 | 20 | 4.5 | 0.5 | 0.25 | 18 | 90 | 72 |
| E9 | −33 | 55 | 30 | 10 | 4.5 | 0.5 | 0.25 | 29 | 89 | 60 |
| E10 | −29 | 85 | | 10 | 4 | 1 | 0.25 | 23 | 94 | 71 |
| E11 | −31 | 87.5 | | 10 | 2 | 0.5 | 0.25 | 25 | 88 | 63 |
| E12 | −36 | 57.5 | 30 | 10 | 2 | 0.5 | 0.25 | 24 | 83 | 59 |
| E13 | −32 | 88.5 | | 10 | 1 | 0.5 | 0.25 | 11 | 89 | 78 |
| V6 [1)] | −28 | 85 | | 10 | 5 | 1 | 0.175 | 0 | 67 | 67 |
| V7 [1)] | −28 | 85 | | 10 | 5 | 1 | 0.15 | 0 | 56 | 56 |
| E14 [1)] | −28 | 85 | | 10 | 5 | 1 | 0.25 | 0 | 82 | 82 |
| E15 [1)] | −28 | 85 | | 10 | 5 | 1 | 0.375 | 0 | 89 | 89 |
| V8 [3)] | | 69 | 30 | | 1 AS | 0.4 | 0.2 | 69 | 82 | 13 |

[1] polymerization in the presence of 0.1 pphm of chain transfer agent tDMK
[2] calculated for mixture of BA, EHA, S, MAA (i.e. without DAAM, ADDH)
[3] comparative test according to the example Polymer 1 of WO 06/066761

Adhesive films were produced and adhesive values measured (Quickstick, peel strength, shear strength, SAFT test heat resistance). The results are shown in table 2.

TABLE 2

Performance results

| Example | Quickstick [N/25 mm] Steel | Quickstick [N/25 mm] PE | Peel strength [N/25 mm] Steel | Peel strength [N/25 mm] PE | Shear strength [h] SC | Shear strength [h] 70° C. | SAFT [° C.] |
|---|---|---|---|---|---|---|---|
| V1  | 13.3 | 10.6 | 13.3 | 7.3 | 9.9   | 0.3   | 109  |
| V2  | 13.4 | 11.0 | 14.5 | 6.8 | 1.6   | 0.1   | 74   |
| V3  | 13.0 | 11.4 | 14.4 | 6.6 | 1.7   | 0.08  | 75   |
| V4  | 13.0 | 10.4 | 14.7 | 7.0 | 4.4   | 0.2   | 88   |
| E1  | 12.4 | 9.6  | 14.7 | 9.2 | 70.1  | >100  | 165  |
| E2  | 14.0 | 9.6  | 14.6 | 9.6 | 67.3  | >100  | 161  |
| E3  | 13.4 | 9.8  | 14.5 | 9.5 | 50.2  | 21.1  | 143  |
| E4  | 13.6 | 8.7  | 13.8 | 5.5 | >100  | >100  | 180  |
| E5  | 13.5 | 9.2  | 13.5 | 7.4 | 28.7  | 11.8  | 146  |
| E6  | 12.4 | 8.6  | 13.7 | 5.2 | 33.3  | >100  | 165  |
| E7  | 13.8 | 9.4  | 14.8 | 6.3 | >100  | >100  | 159  |
| E8  | 14.0 | 8.5  | 14.2 | 6.1 | >100  | >100  | 164  |
| V5  | 1.4  | 1.0  | 19.6 | 8.2 | 15.5  | >100  | 160  |
| E9  | 11.3 | 8.1  | 13.6 | 6.1 | 25.2  | >100  | 161  |
| E10 | 12.2 | 8.5  | 12.8 | 5.6 | >100  | >100  | >180 |
| E11 | 12.8 | 10.0 | 13.4 | 6.0 | 10.2  | 35.0  | 135  |
| E12 | 12.0 | 8.9  | 13.6 | 6.2 | 8.0   | 26.0  | 121  |
| E13 | 12.1 | 9.0  | 11.6 | 5.2 | 3.3   | 3.8   | 153  |
| V6  | 13.0 | 10.6 | 15.8 | 6.7 | 1.8   | 0.1   | 83   |
| V7  | 10.8 | 10.1 | 16.4 | 7.3 | 0.9   | 0.08  | 68   |
| E14 | 12.2 | 10.0 | 15.5 | 7.5 | 33.9  | 13.3  | 135  |
| E15 | 11.5 | 9.9  | 14.9 | 6.5 | 40.6  | >100  | 163  |
| V8  | 5.7  | 4.6  | 6.0  | 2.3 | 0.1   | 0.2   | >180 |

When using carbonyl/hydrazide crosslinking the examples show a marked increase in cohesion and heat resistance for only a small decrease, if any, in adhesion.

Examples V9 to V11 with BDDA Crosslinking and High Gel₀ (Comparison)

Employed here are emulsion polymers produced from the monomers recited in table 3 and admixed with the tackifier Snowtack® 933 E (rosin ester dispersion) in a weight ratio of 75:25 (solids:solids polymer to tackifier). The reported amounts are parts by weight. Tg: about −30° C.

TABLE 3

Emulsion polymers with BDDA crosslinking

| Example | BA | EHA | S | MAA | MA | BDA-2 | Gel$_0$ [%] | Gel$_{tot}$ [%] | Gel$_K$ [%] |
|---|---|---|---|---|---|---|---|---|---|
| V9  | 15 | 59 | 20 | 1 | 5 | 0.07 | 56 | 56 | 0 |
| V10 | 15 | 59 | 20 | 1 | 5 | 0.1  | 69 | 69 | 0 |
| V11 | 15 | 59 | 20 | 1 | 5 | 0.25 | 86 | 89 | 0 |

Adhesive films were produced and adhesive values measured (Quickstick, peel strength, shear strength, SAFT test heat resistance). The results are shown in table 4.

TABLE 4

Performance results

| Example | Quickstick [N/25 mm] Steel | Quickstick [N/25 mm] PE | Peel strength [N/25 mm] Steel | Peel strength [N/25 mm] PE | Shear strength [h] SC | Shear strength [h] 70° C. | SAFT [° C.] |
|---|---|---|---|---|---|---|---|
| V9  | 14.9 | 12.6 | 15.6 | 7.3 | 0.9 | 0.07 | 68 |
| V10 | 15.5 | 12.8 | 14.2 | 7.1 | 0.8 | 0.1  | 71 |
| V11 | 11.3 | 9.2  | 10.6 | 5.3 | 0.8 | 0.1  | 93 |

The examples show that compared to adhesives that have a high gel$_0$ and are crosslinked via monomers having at least two non-conjugated polymerizable vinyl groups (butanediol diacrylate, tables 3 and 4) already during the polymerization, the adhesives that have a high gel$_K$ (tables 1 and 2) and are crosslinked via carbonyl groups and dihydrazides only during film formation have better cohesion values (shear strength) and better heat resistances (SAFT) even at a comparable total gel content gel$_{tot}$ (example V11: 89%), i.e. at a comparable total degree of crosslinking.

The invention claimed is:

1. A pressure-sensitive adhesive composition in the form of an aqueous polymer dispersion, the pressure sensitive adhesive composition comprising:
   (a) a tackifier;
   (b) a compound A comprising at least two functional groups capable of undergoing a crosslinking reaction with keto groups or with aldehyde groups; and
   (c) a pressure-sensitive adhesive polymer formed by emulsion polymerization from
      (i) at least 60% by weight, based on a sum of the monomers, of at least one soft (meth)acrylic ester monomer having, when polymerized as a homopolymer, a glass transition temperature of less than 0° C.,
      (ii) 0.1% to 10% by weight, based on the sum of the monomers, of at least one monomer having at least one acid group,
      (iii) at least 5% and less than 20% by weight, based on the sum of the monomers, of styrene,
      (iv) 0.3% to 5% by weight, based on the total amount of the monomers, of at least one ethylenically unsaturated compound K having at least one functional group selected from keto groups and aldehyde groups, and optionally
      (v) one or more further monomers distinct from (i) to (iv),
   with the exception of monomers having at least two non-conjugated polymerizable vinyl groups,
   wherein the polymerization is carried out in the presence of 0 to 1 parts by weight of a chain transfer agent per 100 parts by weight of the monomers,
   wherein after film formation on a substrate, the pressure-sensitive adhesive polymer has a gel content geltot of at least 80% by weight based on a polymer film produced from the pressure-sensitive adhesive polymer,
   wherein the gel content geltot is at least partially based on a crosslinking of the keto or aldehyde groups of a polymer with compound A and a gel content gelK of the pressure-sensitive adhesive polymer based on crosslinking of the keto or aldehyde groups of the polymer with compound A is at least 30% by weight,
   wherein the gel content in part is optionally based on covalent, irreversible crosslinking not effected by crosslinking of the keto or aldehyde groups of the polymer with compound A and a gel content gel0 of the pressure-sensitive adhesive polymer based on covalent, irreversible crosslinking not effected by crosslinking of the keto or aldehyde groups of the polymer with compound A is from 0% to not more than 50% by weight, wherein a glass transition temperature of the polymer before crosslinking of the keto or aldehyde groups of the polymer with compound A is below 10° C., and wherein after drying, the pressure-sensitive adhesive composition forms a film having a tack of not less than 10 N/25 mm measured as loop tack relative to a steel surface at 23° C., 50% relative humidity and at a tearoff speed of 300 mm/min.

2. The pressure-sensitive adhesive composition according to claim 1, wherein after drying, the pressure-sensitive adhesive composition forms a film having a peel strength greater than 5 N/25 mm relative to a polyethylene surface measured at 23° C., 50% relative humidity and at a tearoff speed of 300 mm/min.

3. The pressure-sensitive adhesive composition according to claim 1, wherein the pressure-sensitive adhesive polymer is formed from 65% to 94% by weight, based on the sum of the monomers, of at least one soft (meth)acrylic acid ester monomer selected from the group consisting of n-butyl acrylate, 2-ethylhexyl acrylate, n-hexyl acrylate, octyl acrylate, heptyl acrylate and ethyl acrylate.

4. The pressure-sensitive adhesive composition according to claim 1, wherein the pressure-sensitive adhesive polymer is formed from 0.5% to 6% by weight, based on the sum of the monomers, of monomers (ii) and wherein the monomers (ii) are at least one selected from the group consisting of acrylic acid, methacrylic acid, and itaconic acid.

5. The pressure-sensitive adhesive composition according to claim 1, wherein the pressure-sensitive adhesive polymer is formed from 6% to 18% by weight, based on the sum of the monomers, of styrene.

6. The pressure-sensitive adhesive composition according to claim 1, wherein the monomers (iv) are selected from the group consisting of acrolein, methacrolein, vinyl alkyl ketones having 1 to 20 carbon atoms in the alkyl radical, formylstyrene, (meth)acrylic acid alkyl esters having one or two keto- or aldehyde groups or having an aldehyde and a keto group in the alkyl radical, N-oxoalkyl (meth)acrylamides, acetoacetyl (meth)acrylate, acetoacetoxyethyl (meth) acrylate and diacetone acrylamide.

7. The pressure sensitive adhesive composition according to claim 1, wherein the compound A is selected from the group consisting of compounds having hydrazide, hydroxylamine, oxime ether or amino groups.

8. The pressure-sensitive adhesive composition according to claim 1, wherein compound A is a dicarboxylic acid dihydrazide having 2 to 10 carbon atoms and wherein monomer (iv) is selected from the group consisting of acetoacetyl (meth)acrylate, acetoacetoxyethyl (meth)acrylate and diacetone acrylamide.

9. The pressure-sensitive adhesive composition according to claim 1, wherein compound A is adipic acid dihydrazide and wherein monomer (iv) is diacetone acrylamide.

10. The pressure-sensitive adhesive composition according to claim 1, wherein a molar ratio of the keto- or aldehyde-reactive groups of the compound A to the keto and aldehyde groups of the at least one ethylenically unsaturated compound K is from 1:10 to 2:1, preferably from 1:1.3 to 1.3:1.

11. The pressure-sensitive adhesive composition according to claim 1, wherein the one or more monomers (v) are employed in amounts of 0% to 10% by weight based on the sum of the monomers and are monomers distinct from the monomers (i) to (iv) selected from the group consisting of a C1 to C20 alkyl (meth)acrylate, a monomer comprising at least one hydroxyl group, a vinyl ester of a carboxylic acid comprising up to 20 carbon atoms, a vinylaromatic having up to 20 carbon atoms, an ethylenically unsaturated nitrile, a vinyl halide, a vinyl ether of an alcohol comprising 1 to 10 carbon atoms, an aliphatic hydrocarbon having 2 to 8 carbon atoms and one or two double bonds and a (meth)acrylamide.

12. The pressure-sensitive adhesive composition according to claim 1, wherein the polymerization is carried out in the presence of 0.01 to 0.75 parts by weight of the chain transfer agent per 100 parts by weight of the monomers.

13. The pressure-sensitive adhesive composition according to claim 1, wherein the gel content gelK is at least 50% by weight and the gel content gel0 is more than 0% and up to 30% by weight.

14. The pressure-sensitive adhesive composition according to claim 1, wherein the pressure-sensitive adhesive composition comprises the tackifier in an amount of 5 to 40 parts by weight based on 100 parts by weight of the polymer.

15. The pressure-sensitive adhesive composition according to claim 1, wherein the pressure-sensitive adhesive polymer is formed from
  (i) at least 65% by weight, based on the sum of the monomers, of at least one acrylic acid ester monomer selected from n-butyl acrylate and 2-ethylhexyl acrylate,
  (ii) 0.5% to 8% by weight, based on the sum of the monomers, of at least one acid monomer selected from the group consisting of acrylic acid, methacrylic acid and itaconic acid,
  (iii) 5% to 19% by weight, based on the sum of the monomers, of styrene,
  (iv) 0.3% to 5% by weight, based on the total amount of the monomers, of at least one ethylenically unsaturated compound having at least one keto group selected from the group consisting of acetoacetyl (meth)acrylate, acetoacetoxyethyl (meth)acrylate and diacetone acrylamide, and
  (v) 0% to 10% by weight, based on the sum of the monomers, of monomers distinct from the monomers (i) to (iv) selected from the group consisting of a C1 to C20 alkyl (meth)acrylate, a monomer comprising at least one hydroxyl group, a vinyl ester of a carboxylic acid comprising up to 20 carbon atoms, a vinylaromatic having up to 20 carbon atoms, an ethylenically unsaturated nitrile, a vinyl halide, a vinyl ether of an alcohol comprising 1 to 10 carbon atoms, and an aliphatic hydrocarbon having 2 to 8 carbon atoms and one or two double bonds,
  wherein the gel content k of the pressure-sensitive adhesive polymer is at least 50% by weight, and
  the gel content gel0 of the pressure-sensitive adhesive polymer is more than 0% and up to 30% by weight, and
  wherein the glass transition temperature of the pressure-sensitive adhesive polymer is below −15° C.

16. An adhesive label, adhesive tape or adhesive film, comprising the pressure-sensitive adhesive composition according to claim 1.

17. A self-adhesive article coated with the pressure-sensitive adhesive composition according to claim 1.

18. A process for producing a self-adhesive article, the process comprising:

coating a substrate with the pressure-sensitive adhesive composition according to claim 1.

\* \* \* \* \*